United States Patent [19]

Yoshino et al.

[11] 4,302,973
[45] Dec. 1, 1981

[54] ALTITUDE DIFFERENCE MEASURING APPARATUS

[75] Inventors: Yasuhisa Yoshino, Okazaki; Akira Kuno, Oobu; Yoshio Shinoda, Okazaki, all of Japan

[73] Assignee: Nippon Soken, Inc., Nishio, Japan

[21] Appl. No.: 109,515

[22] Filed: Jan. 4, 1980

[30] Foreign Application Priority Data

Jan. 23, 1979 [JP] Japan .................................. 54-6920

[51] Int. Cl.³ .......................... G01L 7/08; G01C 71/00
[52] U.S. Cl. .................................. 73/384; 73/178 T; 73/717; 73/DIG. 4
[58] Field of Search ................. 73/386, 387, 721, 727, 73/716, 384

[56] References Cited

U.S. PATENT DOCUMENTS

| | | | |
|---|---|---|---|
| 3,397,581 | 8/1968 | Bush | 73/716 |
| 3,797,308 | 3/1974 | Crane | 73/178 T |
| 3,829,640 | 8/1974 | Taylor | 73/387 |
| 4,226,125 | 10/1980 | Waugh | 73/727 |

Primary Examiner—Donald O. Woodiel
Attorney, Agent, or Firm—Cushman, Darby & Cushman

[57] ABSTRACT

An altitude difference measuring apparatus for measuring the difference between the altitudes at a first and second points on the basis of the barometric difference between the points, having an air pressure holding section with an electromagnetic valve for hermetrically containing an amount of air. At the first place an amount of the ambient air is held hermetrically in the air pressure holding section, and at the second place the barometric difference between the air pressure in the air pressure holding section and the ambient air pressure is converted into an electric signal, and in accordance with the electric signal the difference between the altitudes at the first and second points is indicated.

4 Claims, 7 Drawing Figures

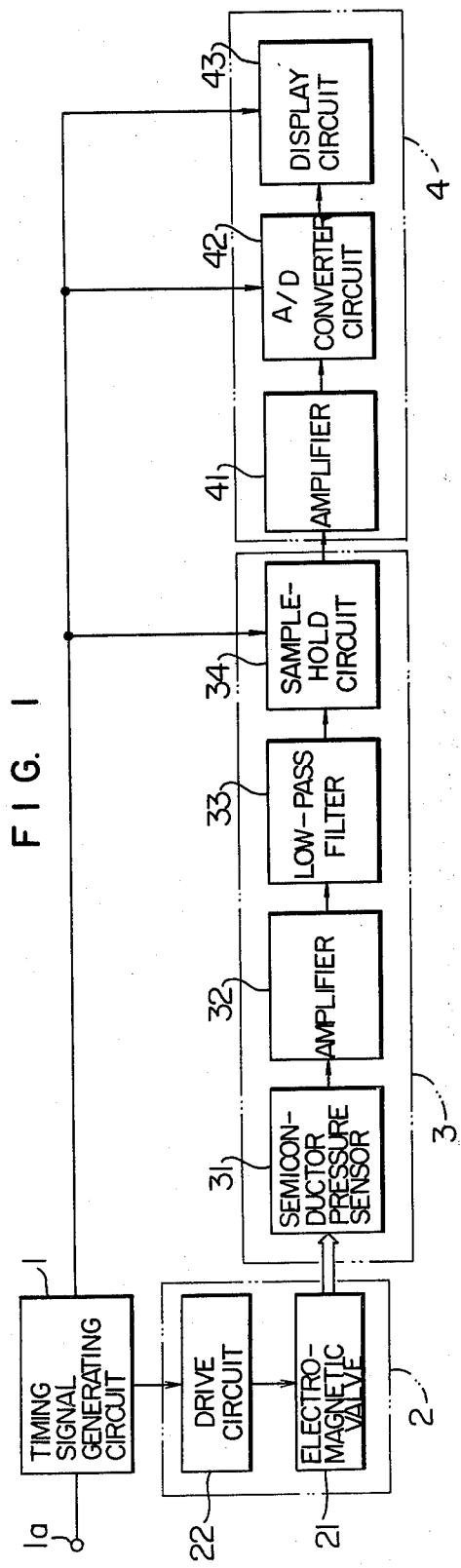
F I G. I
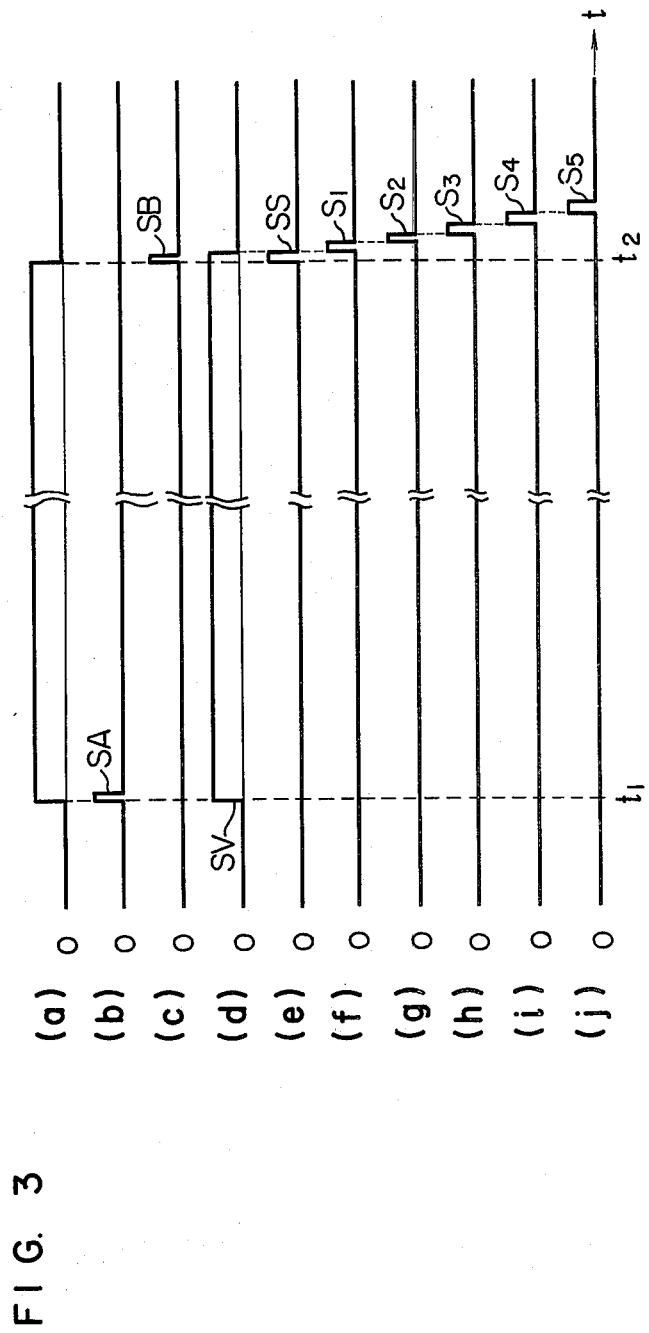
F I G. 3

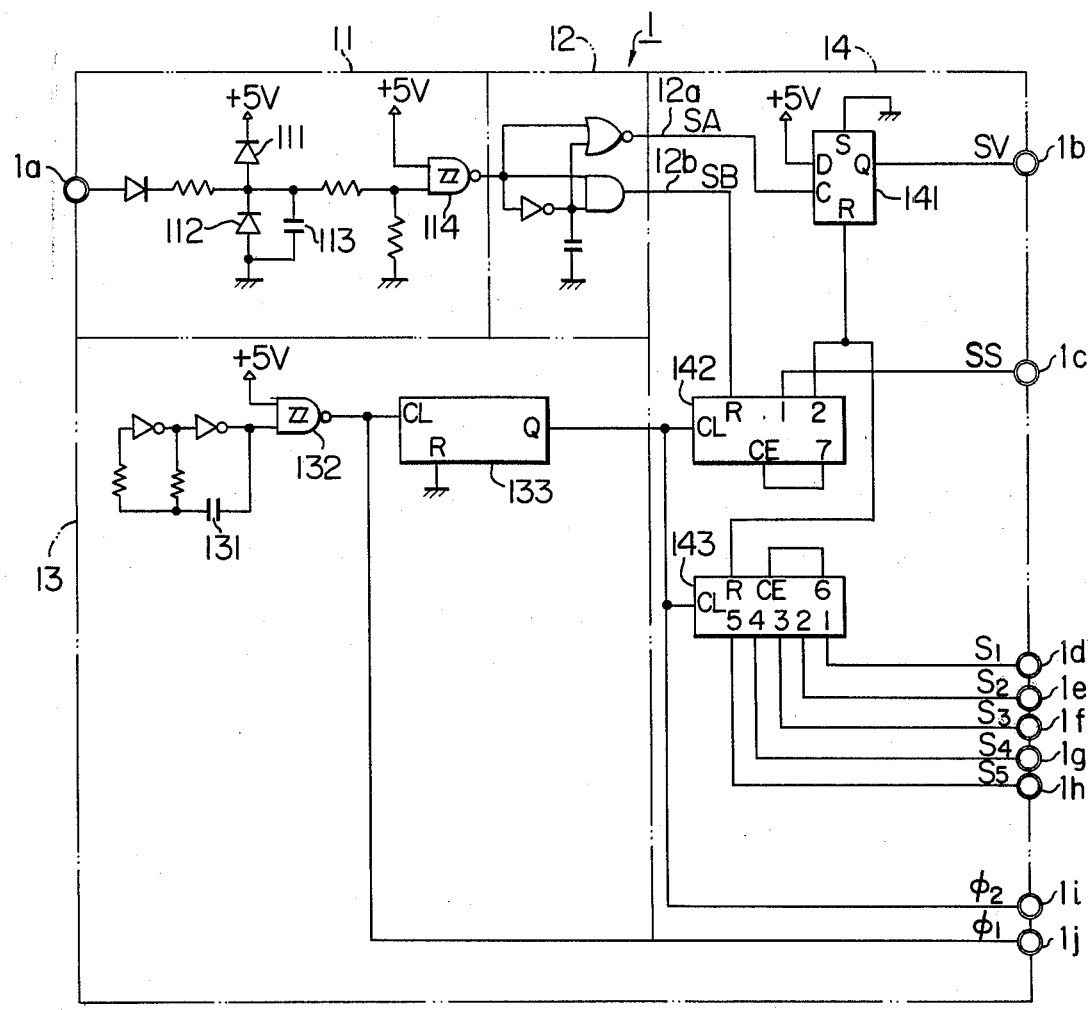
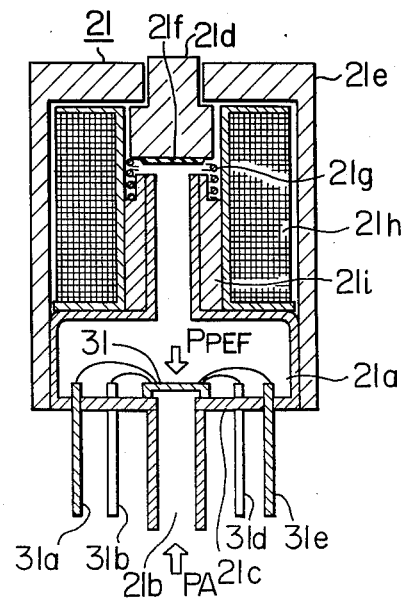

ALTITUDE DIFFERENCE MEASURING APPARATUS

BACKGROUND OF THE INVENTION

This invention relates to an altitude difference measuring apparatus for detecting the difference between the altitudes of two points in the atmosphere of the earth by detecting the barometric difference between the two points.

Examples of the conventional method for measuring altitude differences are a direct measurement using a plumb and a measuring rule and an indirect measurement based on trigonometric survey. However, it is difficult for these direct and indirect methods to measure the difference between the altitudes of two points between which it is impossible to have direct sighting, or to measure the difference between the altitude of any point and that of any other point at every moment while moving.

SUMMARY OF THE INVENTION

An object of this invention is to provide an altitude difference measuring apparatus capable of accurately and easily measuring the difference between the altitudes of any two points.

According to this invention, which has been made to attain the above object, there is provided an altitude difference measuring apparatus which utilizes the phenomenon that atmospheric pressure decreases with altitude (e.g. a decrease in atmospheric pressure by about 1.2 mb per every increase in altitude by 10 m) and which hermetically holds in a hermetically sealed chamber an amount of air at one of the two points of which the altitude difference is to be measured, and obtains the difference between the atmospheric pressures at the two points when the other point is reached, whereby the altitude difference of the two points is obtained on the basis of the obtained barometric difference. It is therefore possible for the apparatus according to this invention to accurately and easily measure the altitude difference of any two points even when one of the points cannot be seen through from the other point, or to perform a measurement of the altitude difference between any two points while moving.

BRIEF DESCRIPTION OF THE DRAWINGS

The above and other objects and advantages of the present invention will become apparent from the following description and accompanying drawings, in which:

FIG. 1 shows in block diagram the general constitution of an altitude difference measuring apparatus as an embodiment of this invention;

FIG. 2 shows an electric wiring diagram of the timing signal generating circuit shown in FIG. 1;

FIG. 3 shows waveforms useful in explaining the operation of the apparatus shown as a whole in FIG. 1;

FIG. 4 shows in longitudinal section the electromagnetic valve shown in FIG. 1;

DESCRIPTION OF THE PREFERRED EMBODIMENTS

Figure 5:
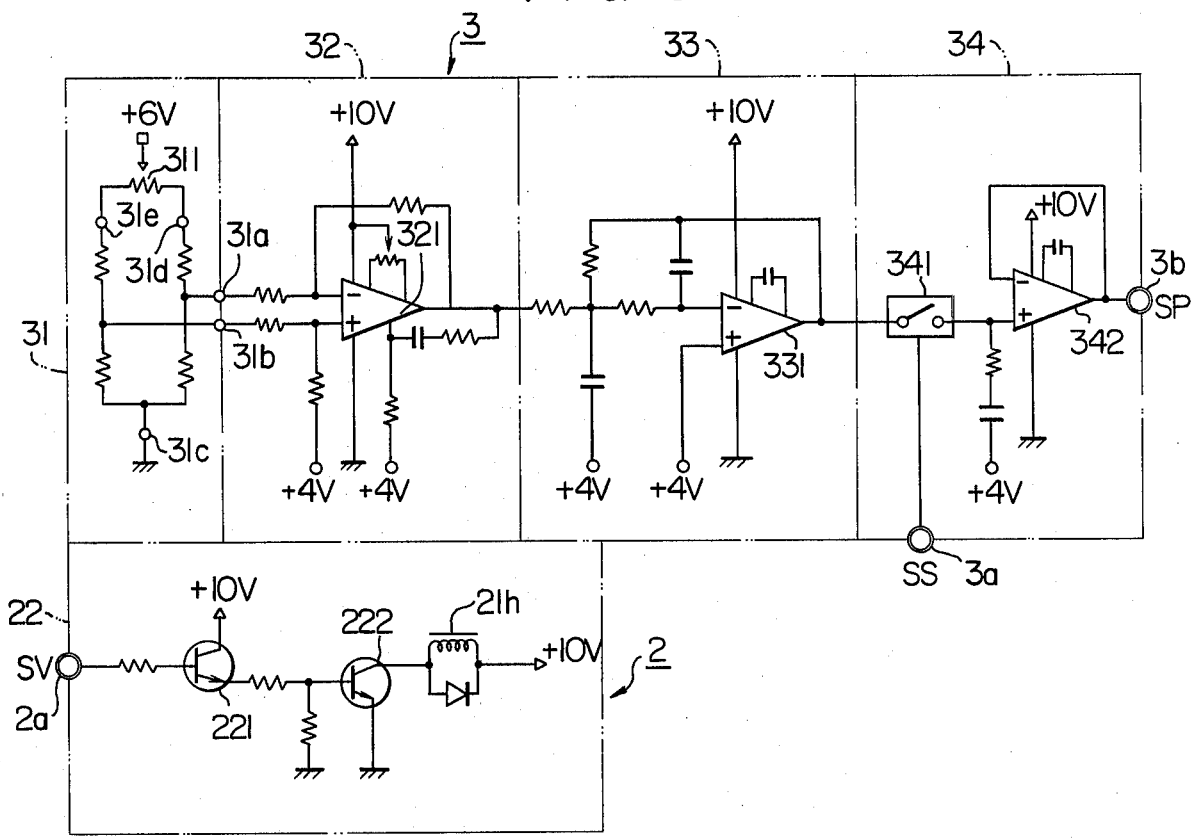
FIG. 5 shows concrete examples of the electric wiring diagrams of the drive circuit and the atmospheric pressure detecting section shown in FIG. 1.

Referring now to the drawings: in FIG. 1 showing the constitution as a whole of an altitude difference measuring apparatus as an embodiment of this invention, reference numeral 1 designates a timing signal generating circuit which responds to external signals received at the terminal 1a and indicative of the start and the end of measurement, respectively, to generate a timing signal to adequately operate various circuits which will be described later. Reference numeral 2 designates an atmospheric pressure holding section incorporating therein an electromagnetic valve 21 and a drive circuit 22 for driving the electromagnetic valve 21. The section 2 contains in its airtight chamber, in hermetically sealed manner, an amount of air at one of two points between which the altitude difference is to be measured, in response to the timing signal from the timing signal generating circuit 1 and holds the atmospheric pressure of the confined air unaltered until the other of the two points is reached. Numeral 3 denotes an atmospheric pressure difference detecting section comprising a semiconductor pressure sensor 31, an amplifier 32, a low-pass filter 33 and a sample-hold circuit 34. The semiconductor pressure sensor 31 produces an electric signal corresponding to the difference between the atmospheric pressure at the first point, held in the electromagnetic valve 21, and the atmospheric pressure at the second point then reached. The electric signal delivered from the sensor 31 is amplified by the amplifier 32. The low-pass filter 33 eliminates noise components contained in the amplified signal delivered from the amplifier 32. The output of the filter 33, i.e. electric signal free from noise, is sampled and held by the sample-hold circuit 34 in response to the timing signal delivered from the timing signal generating circuit 1 at the second point. Reference numeral 4 designates an altitude difference detecting section comprising an amplifier 41, an A/D (analog to digital) converter 42 and a display circuit 43. The output of the sample-hold circuit 34, i.e. electric signal representing the difference between the atmospheric pressures at the first and the second points of which the altitude difference is to be measured, is amplified to a desired magnitude by the amplifier 41. The output of the amplifier 41, i.e., electric signal having a desired magnitude, is converted to a digital signal by the A/D converter 42 in response to the timing signal from the timing signal generating circuit 1. The digital signal is then displayed in numerical representation on the display circuit 43.

Now, the constituent blocks of the circuit shown in FIG. 1 will be described along with their operations. FIG. 2 shows an example of the electric circuit of the timing signal generating circuit 1. At the first one of the two points of which the altitude difference is to be measured, a signal having "1" level is applied to a terminal 1a simultaneously with the start of measurement (at an instant $t_1$). And at the second of the two points (i.e. at an instant $t_2$), a signal having "0" level is applied to the terminal 1a (see FIG. 3-(a)). Reference numeral 11 indicates a limiter and waveform shaping circuit for the signal having the level "1", comprising clipping diodes 111 and 112, a capacitor 113 for absorbing noise, a NAND gate 114 having a hysteresis characteristic etc. A differential pulse generating circuit 12 delivers at its terminals 12a and 12b a measurement start signal SA (diagram b in FIG. 3) and a measurement end signal SB (diagram c in FIG. 3) in response to the leading and the trailing edges of the waveform of the output from the limiter and waveform shaping circuit 11 respectively. A clock signal generating circuit 13 comprises a CR oscillator 131, a NAND gate 132 having a hysteresis characteristic serving as a waveform shaping circuit, and a well-known binary counter (Integrated circuit: TC4024 manufactured by Tokyo Shibaura Electric Co. (abbreviated as Toshiba)) 133 serving as a frequency divider, and delivers a reference clock signal $\phi 1$ (of e.g. 114 KHz) and a frequency-dividing clock signal $\phi 2$ (of e.g. 110 Hz). A timing signal forming circuit 14 receives the measurement start signal SA, the measurement end signal SB and the frequency-dividing clock signal $\phi 2$, to form a desired timing signal. The timing signal forming circuit 14 comprises a valve signal generating circuit 141, a sample signal generating circuit 142 and an A/D converting and display timing signal generating circuit 143. The valve signal generating circuit 141 may be a well-known D flip-flop (e.g. Integrated circuit: TC4013 of Toshiba) and delivers at its terminal 1b a signal SV (diagram (d) in FIG. 3) for actuating the electromagnetic valve 21. The sample signal generating circuit 142 may be a decoder/counter (e.g. Integrated circuit: TC4017 of Toshiba) and delivers from its terminal 1c a sample-hold signal SS (diagram (e) in FIG. 3) to the sample-hold circuit 33. The A/D converting and display timing signal generating circuit 143 may be a decoder/counter (e.g. Integrated circuit: TC4-17 of Toshiba) and outputs at its terminal 1d and A/D conversion starting signal S1 (diagram (f) in FIG. 3) to the A/D converter and at its terminals 1e, 1f, 1g and 1h timing signals S2, S3, S4 and S5 (diagrams (g), (h), (i) and (j) in FIG. 3) which are necessary for the display circuit 43. When the measurement start signal SA is inputted to the valve signal generating circuit 141 at the time $t_1$, the signal SV at the terminal Q (i.e. at the terminal 1b) becomes level "1". Thereafter, when the signal from the second stage <2> of the sample signal generating circuit 142 becomes "1" level immediately after the time $t_2$, the valve signal generating circuit 141 is reset to deliver an output of "0" level. The sample signal generating circuit 142 is reset at the time $t_2$ by the measurement end signal SB and when the frequency-dividing clock signal $\phi 2$ is inputted to the circuit 142, the first and second stages <1> and <2> respectively generate the sample-hold signal SS and the reset signals for the valve signal generating circuit 141 and the A/D converting and display timing signal generating circuit 143. And when the output of the seventh stage <7> turns to level "1", the terminal CE connected therewith receives the level "1" to stop the measurement operation. The A/D converting and display timing signal generating circuit 143 is reset when the second stage <2> of the sample signal generating circuit 142 delivers the level "1". Upon reception of the frequency-dividing clock signal $\phi 2$, the circuit 143 outputs from its first to fifth stages <1>, <2>, <3>, <4> and <5> the A/D conversion start signal S1, the preset signal S2 as a timing signal necessary for the display circuit 43, the up/down (U/D) reset signal S3, the count-down or subtraction reset signal S4 and the latch signal S5. When the output of the sixth stage <6> turns to "1", the counting operation the circuit 143 is stopped.

FIG. 4 shows in sectional view an electromagnetic valve 21 serving as an air-pressure holding section, in which a well-known semiconductor pressure sensor 31 of diaphragm type isolates a hermetically sealed chamber 21a from the atmosphere 21b. The hermetically sealed chamber 21a is constructed with wall member 21c of metal and is usually open to the atmosphere. A movable core 21d of iron is bottomed with a valve seat 21f of rubber. A fixed core 21e of iron has at its top a cylindrical hole through which the movable core 21d can be supported and also moved up and down. A spring 21g urges the movable core 21d upward and a central core 21i surrounds the upper tubular portion of the wall member 21c. A coil 21h is wound around the central core 21i. When the coil 21h is energized by the drive circuit 22, the movable core 21d is pulled downward, overcoming the upward urging force by the spring 21g, so that the hermetically sealed chamber 21a is completely sealed by the valve seat 21f, holding the air pressure $P_{REF}$ at a desired point. When, on the other hand, the coil 21h is deenergized, the movable core 21d is shifted up by the extension force of the spring 21g so that the hermetically sealed chamber 21a is opened to the atmosphere. The gap left between the valve seat 21f and the top end of the tubular portion of the wall member 21c when the coil 21h is not energized, is designed to be so small so that the air pressure in the hermetically sealed chamber 21a may not be changed even when the movable core 21d, being shifted downward by the energization of the coil 21h, seals the chamber 21a. The semiconductor pressure sensor 31 has terminals 31a, 31b, 31c (not shown in FIG. 4), 31d and 31e which pierce the bottom wall of the wall member 21c and are arranged in a circle. An electric signal proportional to the difference between the air-pressure $P_{REF}$ in the hermetically sealed chamber 21a and the ambient air-pressure $P_A$ is outputted across the terminals 31a and 31b.

The terminal 31c of the pressure sensor 31 is grounded and a potentiometer 311 serving as a part of the semiconductor pressure sensor 31 for balance adjustment is connected across the terminals 31d and 31e.

FIG. 5 shows examples of the electric circuits of the drive circuit 22 for the electromagnetic valve 21 and the atmospheric pressure detecting section 3 comprising the semiconductor pressure sensor 31, the amplifier 32, the low-pass filter 33 and the sample-hold circuit 34. When the drive circuit 22 for the electromagnetic valve 21 receives at its terminal 2a the signal SV having level "1" (diagram (d) in FIG. 3) outputted by the timing signal generating circuit 1 at the terminal 1b at the time $t_1$, transistors 221 and 222 are both turned on so that current flows through the coil 21h of the valve 21 to cause the movable core 21d to be attracted toward the central core 21i until the hermetically sealed chamber 21a is sealed. In the atmospheric pressure detecting section 3, a small electric signal outputted from the semiconductor pressure sensor 31 is sent through the terminals 31a and 31b to the amplifier 32. The potentiometer 311 serving as a part of the sensor 31, as described above, is for balance adjustment. The amplifier 32 may be a differential amplifier comprised of a well-known operational amplifier 321 (e.g. Integrated circuit: MA725 by Fairchild Co.), resistors, capacitors etc. and serves to amplify the small electric signal from the sensor 31. The low-pass filter 33 comprising an operational amplifier 331 (e.g. Integrated circuit: LM201 made by National Semiconductor Co.), resistors and capacitors, serves to eliminate noise contained in the amplified signal. The output of the low-pass filter 33, free from noise, changes or rises and falls about a voltage of 4 V as a center voltage. The sample-hold circuit 34 comprising a well-known analog switch 341 (e.g. Integrated circuit: CD4066 by RCA), an operational amplifier 342 (e.g. Integrated circuit: CA3130 by RCA), capacitors and resistors, samples and holds the electric signal free from noise immediately after the measurement finish signal SB (diagram (c) in FIG. 3) in response to the sample-hold signal SS (diagram (e) in FIG. 3) delivered from the terminal 1c of the timing signal generating circuit 1 and received at the terminal 3a of the sample-hold circuit 34, and then outputs the signal SP at the terminal 3b.

Figure 6:
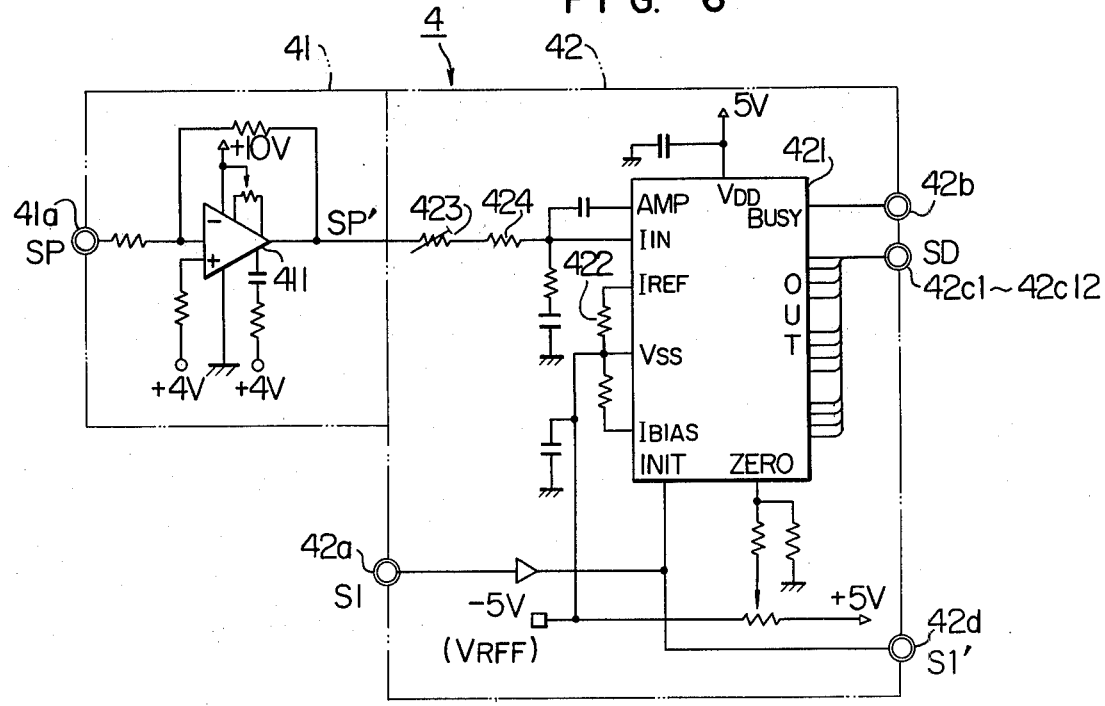
FIGS. 6 and 7 show an electric circuit of the altitude difference detecting section shown in FIG. 1.
Figure 7:
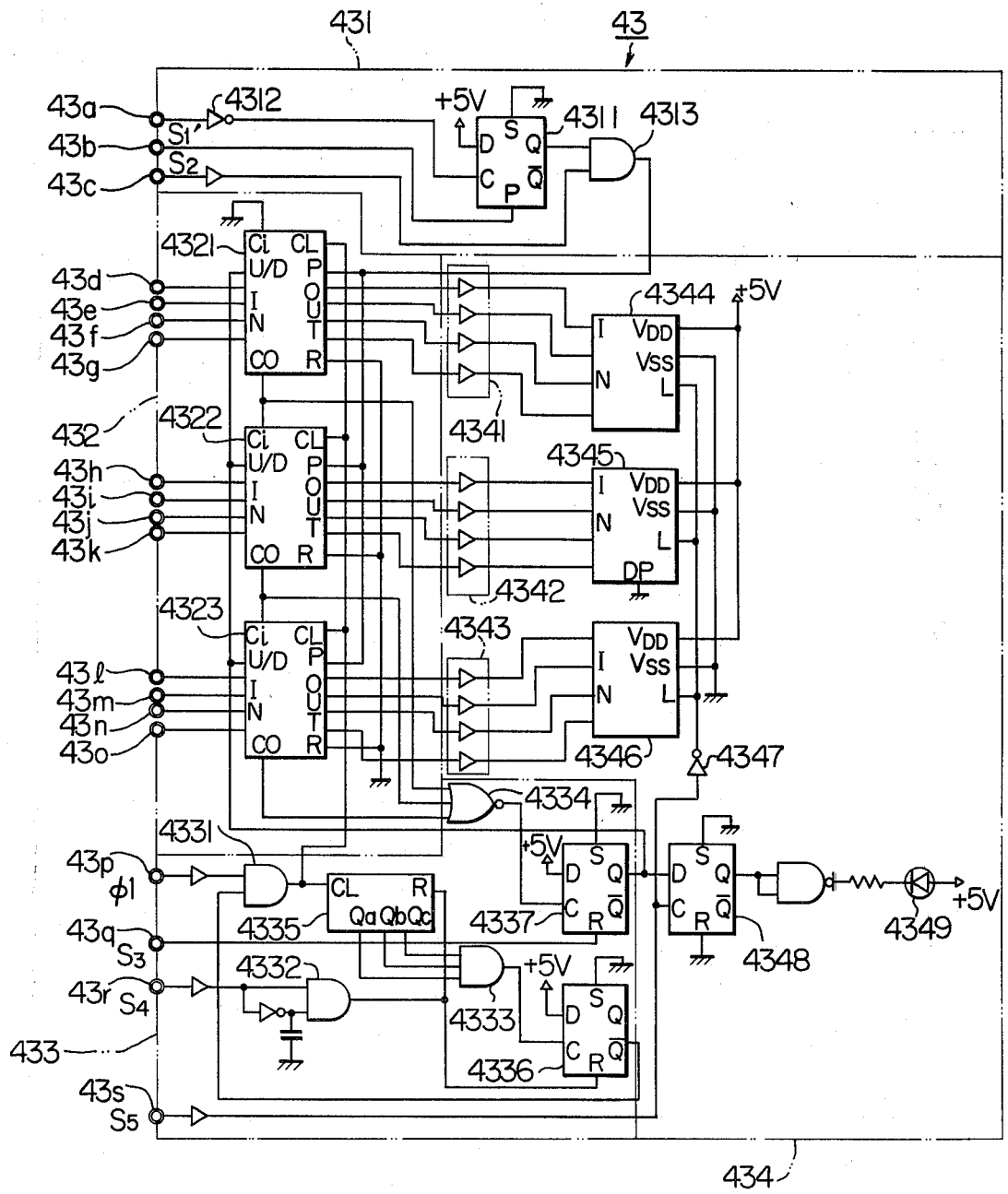

FIGS. 6 and 7 show an electric circuit of the altitude difference detecting section 4. In FIG. 6, the amplifier circuit 41 comprises a well-known operational amplifier 411 (e.g. Integrated circuit: MA725 by Fairchild Co.), resistors and capacitors and serves to amplify the signal SP outputted from the sample-hold circuit 34 to the terminal 41a and representing the difference between the air pressures at the first and the second points. The signal SP' outputted from the amplifying circuit 41 changes up and down about the center voltage of 4 V.

The A/D converter circuit 42 comprises a well-known A/D converter 421 (e.g. 87500J by Teledyne Co.), resistors, capacitors etc. and serves to convert the analog signal SP' to a digital signal based on the B.C.D. code having three digits or three figures. The A/D conversion is started in response to the leading edge of the A/D conversion start signal S1 (diagram (f) in FIG. 3) received at the terminal 42a and when the A/D conversion ends, the signal at the BUSY terminal (terminal 42b) falls down to become "0" level. The relationship between the analog signal SP' and the digital output signal SD (terminal 42C$_1$ to terminal 42C$_{12}$) as its digital version is given by the following expression:

$$N = (A \cdot V_{IN} \cdot R_{REF})/(R_{IN} \cdot V_{REF}),$$

where N is the number of digital counts, $V_{IN}$ the input voltage (SP'), $R_{REF}$ the resistance of the reference resistor 422, $R_{IN}$ the sum of the resistances of the input resistors 423 and 424, $V_{REF}$ the reference voltage of $-5$ V and A a constant of 4128. For example, assuming that the number of digital counts for $V_{IN} = 8$ V be $N_{MAX}$, the number N of the digital counts becomes $N_{MAX}/2$ when the barometric difference between the first and the second points is 0 mb, that is, when $V_{IN} = SP' = 4$ V. Here, it is assumed that the altitude difference to produce a barometric change corresponding to the input voltage of $V_{IN}$ ($= SP' = 8$ V) is adjusted to $N_{MAX}/2$ meters.

FIG. 7 shows in detail the display circuit 43 in the altitude difference detecting section 4, comprising a preset circuit 431, a counting circuit 432, a subtracting circuit 433 and an altitude difference display circuit 434. The preset circuit 431 includes a NOT gate 4312, a D flip-flop 4311 (e.g. Integrated circuit: TC4013 by Toshiba), an AND gate 4313 etc. When the level of the output at the terminal BUSY of the A/D converter 421 falls to "0" level in response to the completion of the A/D conversion, this output is sent to and received by the D flip-flop 4311 via the terminal 43a and the NOT gate 4312. Accordingly, the output at the terminal Q of the D flip-flop 4311 becomes "1" so that the AND gate 4313 is opened to pass the preset signal S2 (diagram (g) in FIG. 3) received at the terminal 43c. The terminal 43b is connected with the terminal 42d of the A/D converting circuit 42 and the D flip-flop 4311 is reset by a signal S1' synchronized with the A/D conversion start signal S1. The counting circuit 432 includes well-known up/down (U/D) counters 4321, 4322 and 4323 (e.g. Integrated circuit: CD4510 by RCA). When the preset signal S2 past the AND gate 4313 is received by the U/D counters 4321, 4322 and 4323, the digital output signals received at the terminals 43d–43o is preset in the U/D counters 4321, 4322 and 4323. Since the final display of the measured altitude difference is desired to be made in meters with a positive or negative sign, the use of the subtracting circuit 433 is necessary. The subtracting circuit 433 includes AND gates 4331, 4332 and 4333, a NOR gate 4334, D flip-flops 4336 and 4337 (e.g. Integrated circuit: TC 4013 By Toshiba), a binary counter 4335 (e.g. Integrated circuit: TC 4024 by Toshiba) etc. The D flip-flop 4337 delivers at its terminal Q an output having the level "0" in response to the U/D reset signal S3 (diagram (h) in FIG. 3) inputted from the terminal 43q so that all the U/D counters of the counting circuit 432 begins to count down. Then, the binary counter 4335 and the D flip-flop 4336 are reset in response to the leading edge of the subtraction reset signal S4 (diagram (h) in FIG. 3) received at the terminal 43r and the binary counter 4335 becomes ready for counting. Simultaneously, the output at the terminal $\overline{Q}$ of the D flip-flop 4336 becomes the level "1" to open the AND gate 4331 and the reference clock signal $\phi 1$, received at the terminal 43p, is inputted to the binary counter 4335 and all the U/D counters of the counting circuit 432. When $N_{MAX}/2$ pulses of the clock signal $\phi 1$ are inputted to the binary counter 4335, the output of the AND gate 4333 becomes the level "1" so that the output of the D flip-flop 4336 at its terminal $\overline{Q}$ becomes the level "0" to close the AND gate 4331. Namely, subtraction is performed in such a manner that the number of counts preset in the counting circuit 432 minus $N_{MAX}/2$ is reached. In this case, if $N_{MAX}/2$ is greater than the present number, the three-input NOR gate 4334 delivers an output having the level "1" when the contents of all the U/D counters become zero. Then, the output at the terminal Q of the D flip-flop 4337 becomes the level "1" so that all the U/D counters of the counting circuit 432 begin to count up. Accordingly, the final content of the U/D counter is the absolute value of the difference between the preset number and $N_{MAX}/2$. Moreover, the signal from the terminal Q of the D flip-flop 4337 gives the criterion for determining whether the preset number is greater or smaller than $N_{MAX}/2$ and therefore the sign for the altitude difference can be determined. The altitude difference display circuit 434 includes well-known buffers 4341, 4342 and 4343 (e.g. Integrated circuit: CD 4050 by RCA), an inverter 4347, a D flip-flop 4348 (e.g. Integrated circuit: TC 4013 by Toshiba), well-known numerical displayers 4344, 4345 and 4346 using LED's (e.g. 5082-7300 by Yokokawa Hewlet Paccard), a LED (light emitting diode) 4349 etc. The numerical displayers 4344, 4345 and 4346 display altitude differences as final results in meters by receiving the output signal from the counting circuit 432 in response to the latch signal S5 (diagram (j) in FIG. 3). The output signal from the subtracting circuit 433 causes the LED 4349 to be lit up when the altitude of the first point is greater than the altitude of the second point, and otherwise the LED 4349 remains deenergized.

After the series of the operations described above, a measurement of an altitude difference ends.

In the above embodiment, the altitude difference is displayed by numerals, but bar-graph, picture or lamp representations may be employed. Also, the result of the measurement may be utilized as information representing potential energy, not simply as a visible display.

Furthermore, in the above embodiment, the semiconductor pressure sensor 31 and the electromagnetic valve 21 are formed in a single unit, but any electromagnetic valve may be used wherein its hermetically sealed chamber can be kept air-tight during measurement and the confined air can exert pressure on the associated pressure sensor.

Further, it may be constructed such that the opening and closure of the hermetically sealed chamber are performed by manual operations.

In addition, the signals applied to the terminal 1a of the timing signal generating circuit 1 for indicating the start and end of the measurement may be supplied through manual operations at one of the first and the second points of which the altitude difference is to be measured. Also, e.g. when this apparatus is mounted on a car, it may be constructed such that the above signals are applied automatically each time the car travels a certain distance.

We claim:

1. An altitude difference measuring apparatus for measuring the difference between altitudes at a first and at a second point comprising:
   a solid wall member forming a chamber of a fixed volume and having first and second openings communicating with the atmosphere;
   a semiconductor pressure sensor positioned to hermetically seal said first opening of said wall member, said pressure sensor delivering an electric signal corresponding to the difference between the pressures present in said chamber and in the atmosphere;
   an electromagnetic valve positioned adjacent to said second opening of said wall member and including a winding and a movable core, said movable core being normally biased to allow said chamber of said wall member to communicate with the atmosphere through said second opening and effective to hermetically seal said second opening during the energization of said winding;
   a circuit means for energizing said winding of said electromagnetic valve from the arrival at said first point until after the arrival at said second point;
   sample and hold means for sampling and holding said electric signal developed from said pressure sensor in synchronism with the arrival at said second point; and
   altitude difference detecting means for detecting the difference between the altitudes of said first and second points in response to the sampled and held electric signal.

2. An altitude difference measuring apparatus claimed in claim 1, wherein said sample and hold means includes an analog switch which is adapted to close by a sample-hold signal generated upon arrival at said second point, and a circuit including an operational amplifier for holding said electrical signal inputted through said analog switch.

3. An altitude difference measuring apparatus claimed in claim 1, wherein said altitude difference detecting means includes an amplifier for amplifying the output of said sample and hold means, an analog to digital converter for converting an analog signal outputted from said amplifier into a digital signal, and a display circuit for displaying said digital signal in numerical representation.

4. An altitude difference measuring apparatus in accordance with claim 3 wherein said display circuit includes a counting circuit and a subtracting circuit, so that the numerical designation includes a positive or negative sign corresponding to altitude change between the first and second points.

* * * * *